US011930419B2

(12) United States Patent
Patel et al.

(10) Patent No.: US 11,930,419 B2
(45) Date of Patent: *Mar. 12, 2024

(54) AUTONOMOUS HANDOVER ON A SHARED COMMUNICATION MEDIUM

(71) Applicant: QUALCOMM Incorporated, San Diego, CA (US)

(72) Inventors: Chirag Sureshbhai Patel, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,535

(22) Filed: May 16, 2022

(65) Prior Publication Data

US 2022/0279416 A1 Sep. 1, 2022

Related U.S. Application Data

(63) Continuation of application No. 15/299,047, filed on Oct. 20, 2016.

(Continued)

(51) Int. Cl.
H04W 36/30 (2009.01)
H04W 36/00 (2009.01)
(Continued)

(52) U.S. Cl.
CPC ....... H04W 36/32 (2013.01); H04W 36/0061 (2013.01); H04W 36/00835 (2018.08);
(Continued)

(58) Field of Classification Search
CPC ............. H04W 36/32; H04W 36/0061; H04W 36/00835; H04W 36/00837; H04W 36/30;
(Continued)

(56) References Cited

U.S. PATENT DOCUMENTS 6,405,021 B1 6/2002 Hamabe
9,155,014 B2 10/2015 Tenny et al.
(Continued)

FOREIGN PATENT DOCUMENTS

EP 2696624 A1 2/2014
WO 2013038052 A1 3/2013
(Continued)

OTHER PUBLICATIONS

International Preliminary Report on Patentability—PCT/US2016/058094, The International Bureau of WIPO—Geneva, Switzerland, dated Feb. 5, 2018.

(Continued)

Primary Examiner — Thinh D Tran
(74) Attorney, Agent, or Firm — MG-IP Law, P.C.

(57) ABSTRACT

Techniques for autonomous handover signaling on a shared communication medium are disclosed. An access terminal may receive, from an access point, one or more configuration messages configuring the access terminal for autonomous handover and including a parameter defining one or more autonomous handover triggering events. The access point may perform one or more mobility measurements on a communication medium and monitor for the one or more autonomous handover triggering events based on the one or more mobility measurements. The access terminal may perform an autonomous handover from a source access point to a target access point based on the monitoring.

20 Claims, 10 Drawing Sheets

Related U.S. Application Data

(60) Provisional application No. 62/244,681, filed on Oct. 21, 2015.

(51) Int. Cl.
*H04W 36/32* (2009.01)
*H04W 36/36* (2009.01)
*H04W 36/24* (2009.01)

(52) U.S. Cl.
CPC ..... *H04W 36/00837* (2018.08); *H04W 36/30* (2013.01); *H04W 36/36* (2013.01); *H04W 36/24* (2013.01)

(58) Field of Classification Search
CPC .. H04W 36/36; H04W 36/24; H04W 36/0083
See application file for complete search history.

(56) References Cited

U.S. PATENT DOCUMENTS

| | | | |
|---|---|---|---|
| 9,380,500 | B1 | 6/2016 | Stewart et al. |
| 2003/0013448 | A1* | 1/2003 | Dillinger ............... H04W 36/18 455/437 |
| 2007/0111731 | A1 | 5/2007 | Zaki |
| 2010/0118731 | A1* | 5/2010 | Koyanagi ......... H04W 36/0085 370/252 |
| 2010/0124203 | A1* | 5/2010 | Tenny ................... H04W 36/24 370/331 |
| 2010/0222059 | A1 | 9/2010 | Pani et al. |
| 2011/0103350 | A1* | 5/2011 | Lindoff ............. H04W 36/0094 370/332 |
| 2011/0268085 | A1 | 11/2011 | Barany et al. |
| 2012/0244864 | A1* | 9/2012 | Fujii ................. H04W 36/0066 455/436 |
| 2014/0031027 | A1 | 1/2014 | Dalsgaard |
| 2014/0301214 | A1 | 10/2014 | Zhang et al. |
| 2015/0133121 | A1* | 5/2015 | Li ..................... H04W 36/0085 455/436 |
| 2015/0215847 | A1 | 7/2015 | Yie et al. |
| 2015/0319774 | A1 | 11/2015 | Cai et al. |
| 2015/0327286 | A1 | 11/2015 | Yiu et al. |
| 2016/0021585 | A1 | 1/2016 | Pedersen et al. |
| 2016/0212674 | A1 | 7/2016 | Nakamura et al. |
| 2017/0118690 | A1 | 4/2017 | Patel et al. |
| 2017/0230984 | A1 | 8/2017 | Wang et al. |
| 2017/0367059 | A1 | 12/2017 | Park et al. |
| 2018/0007574 | A1 | 1/2018 | Park et al. |
| 2018/0115967 | A1* | 4/2018 | Ahn ..................... H04W 48/16 |
| 2018/0184317 | A1* | 6/2018 | Li ..................... H04W 74/0816 |
| 2018/0213569 | A1 | 7/2018 | Guan et al. |

FOREIGN PATENT DOCUMENTS

| | | |
|---|---|---|
| WO | 2013177778 A1 | 12/2013 |
| WO | 2014161576 A1 | 10/2014 |

OTHER PUBLICATIONS

International Search Report and Written Opinion—PCT/US2016/058094—ISA/EPO—dated Juan. 25, 2017.

Park et al., U.S. Appl. No. 62/109,616 "Advanced RLM Behaviors With 3D-MIMO Beamforming", filed Jan. 30, 2015.

ZTE: "Consideration on configuration of AP Group," 3GPP Draft; R2-153347, 3rd Generation Partnership Project (3GPP), Mobile Competence Centre ; 650, Route Des Lucioles ; F-06921 Sophia-Antipolis Cedex ; France vol. RAN WG2, No. Beijing, China; Aug. 24, 2015-Aug. 28, 2015 Aug. 23, 2015 (Aug. 23, 2015), XP051004083, Retrieved from the Internet: URL:http://www.3gpp.org/ftp/Meetings_3GPP_SYNC/RAN2/Docs/ - - [retrieved on Aug. 23, 2015], 4 pages.

\* cited by examiner

AUTONOMOUS HANDOVER ON A SHARED COMMUNICATION MEDIUM

CROSS-REFERENCE TO RELATED APPLICATIONS

The present application is a continuation of U.S. patent application Ser. No. 15/299,047, entitled "AUTONOMOUS HANDOVER ON A SHARED COMMUNICATION MEDIUM," filed Oct. 20, 2016, which claims the benefit of U.S. Provisional Application No. 62/244,681, entitled "Autonomous Handover on a Shared Communication Medium," filed Oct. 21, 2015, each of which is assigned to the assignee hereof and expressly incorporated herein by reference in its entirety.

BACKGROUND

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as $5^{th}$ generation (5G)/new radio (NR) Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell operations have been extended into so-called "unlicensed" and "lightly licensed" frequency spectra, for example, such as the Unlicensed National Information Infrastructure (U-NII) band and the Citizens Broadband (CB) Radio Service band. This extension of small cell operation is designed to increase spectral efficiency and hence overall system capacity. However, it may also lead to varying degrees of interference between small cell operators as their devices compete for access to shared resources.

SUMMARY

The following summary is an overview provided solely to aid in the description of various aspects of the disclosure and is provided solely for illustration of the aspects and not limitation thereof.

In one example, a communication method is disclosed. The method may include, for example, receiving, at an access terminal from an access point, one or more configuration messages configuring the access terminal for autonomous handover and including a parameter defining one or more autonomous handover triggering events; performing, at the access terminal, one or more mobility measurements on a communication medium; monitoring, at the access terminal, for the one or more autonomous handover triggering events based on the one or more mobility measurements; and performing, at the access terminal, an autonomous handover from a source access point to a target access point based on the monitoring.

In another example, a communication apparatus is disclosed. The apparatus may include, for example, at least one processor, at least one memory coupled to the at least one processor, and at least one transceiver. The at least one transceiver may be configured to receive, at an access terminal from an access point, one or more configuration messages configuring the access terminal for autonomous handover and including a parameter defining one or more autonomous handover triggering events. The at least one processor and the at least one memory may be configured to perform, at the access terminal, one or more mobility measurements on a communication medium; monitor, at the access terminal, for the one or more autonomous handover triggering events based on the one or more mobility measurements; and perform, at the access terminal, an autonomous handover from a source access point to a target access point based on the monitoring.

In another example, another communication apparatus is disclosed. The apparatus may include, for example, means for receiving, at an access terminal from an access point, one or more configuration messages configuring the access terminal for autonomous handover and including a parameter defining one or more autonomous handover triggering events; means for performing, at the access terminal, one or more mobility measurements on a communication medium; means for monitoring, at the access terminal, for the one or more autonomous handover triggering events based on the one or more mobility measurements; and means for performing, at the access terminal, an autonomous handover from a source access point to a target access point based on the monitoring.

In another example, a transitory or non-transitory computer-readable medium is disclosed, which, when executed by at least one processor, causes the at least one processor to perform operations for communication. The computer-readable medium may include, for example, code for receiving, at an access terminal from an access point, one or more configuration messages configuring the access terminal for autonomous handover and including a parameter defining one or more autonomous handover triggering events; code for performing, at the access terminal, one or more mobility measurements on a communication medium; code for monitoring, at the access terminal, for the one or more autonomous handover triggering events based on the one or more mobility measurements; and code for performing, at the access terminal, an autonomous handover from a source access point to a target access point based on the monitoring.

In another example, another communication method is disclosed. The method may include, for example, receiving, at an access terminal from an access point, one or more configuration messages configuring the access terminal for autonomous handover and including a set of parameters for one or more autonomous handover triggering events; determining, at the access terminal, a traffic class associated with service from a source access point; selecting, at the access terminal, one or more parameters of the set of parameters based on the determined traffic class; performing, at the access terminal, one or more mobility measurements on a communication medium; monitoring, at the access terminal, for the one or more autonomous handover triggering events based on the one or more selected parameters and the one or more mobility measurements; and performing, at the access terminal, an autonomous handover from the source access point to a target access point based on the monitoring.

In another example, another communication apparatus is disclosed. The apparatus may include, for example, at least one processor, at least one memory coupled to the at least one processor, and at least one transceiver. The at least one transceiver may be configured to receive, at an access terminal from an access point, one or more configuration messages configuring the access terminal for autonomous handover and including a set of parameters for one or more autonomous handover triggering events. The at least one processor and the at least one memory may be configured to determine, at the access terminal, a traffic class associated with service from a source access point; select, at the access terminal, one or more parameters of the set of parameters based on the determined traffic class; perform, at the access terminal, one or more mobility measurements on a communication medium; monitor, at the access terminal, for the one or more autonomous handover triggering events based on the one or more selected parameters and the one or more mobility measurements; and perform, at the access terminal, an autonomous handover from the source access point to a target access point based on the monitoring.

In another example, another communication apparatus is disclosed. The apparatus may include, for example, means for receiving, at an access terminal from an access point, one or more configuration messages configuring the access terminal for autonomous handover and including a set of parameters for one or more autonomous handover triggering events; means for determining, at the access terminal, a traffic class associated with service from a source access point; means for selecting, at the access terminal, one or more parameters of the set of parameters based on the determined traffic class; means for performing, at the access terminal, one or more mobility measurements on a communication medium; means for monitoring, at the access terminal, for the one or more autonomous handover triggering events based on the one or more selected parameters and the one or more mobility measurements; means for and performing, at the access terminal, an autonomous handover from the source access point to a target access point based on the monitoring.

In another example, a transitory or non-transitory computer-readable medium is disclosed, which, when executed by at least one processor, causes the at least one processor to perform operations for communication. The computer-readable medium may include, for example, code for receiving, at an access terminal from an access point, one or more configuration messages configuring the access terminal for autonomous handover and including a set of parameters for one or more autonomous handover triggering events; code for determining, at the access terminal, a traffic class associated with service from a source access point; code for selecting, at the access terminal, one or more parameters of the set of parameters based on the determined traffic class; code for performing, at the access terminal, one or more mobility measurements on a communication medium; code for monitoring, at the access terminal, for the one or more autonomous handover triggering events based on the one or more selected parameters and the one or more mobility measurements; code for and performing, at the access terminal, an autonomous handover from the source access point to a target access point based on the monitoring.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to autonomous handover for an access terminal with assistance from an access point. To improve mobility performance of the access terminal when operating on a shared communication medium subject to frequent periods of inaccessibility, the access terminal may be configured to perform handover from a source access point to a target access point under certain conditions without being required to send a measurement report or other notifications to the source access point. The access terminal may be configured in different ways, including with a neighbor list of access points to which autonomous handover is allowed, a priority among the access points, timing parameters identifying access point reference signaling, and various autonomous handover triggering events. Such triggering events may include, for example, a traffic class trigger, a travel speed trigger, a cell type trigger, a median signal strength trigger, a reference signal activity trigger, and so on, employed individually or in various combinations.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
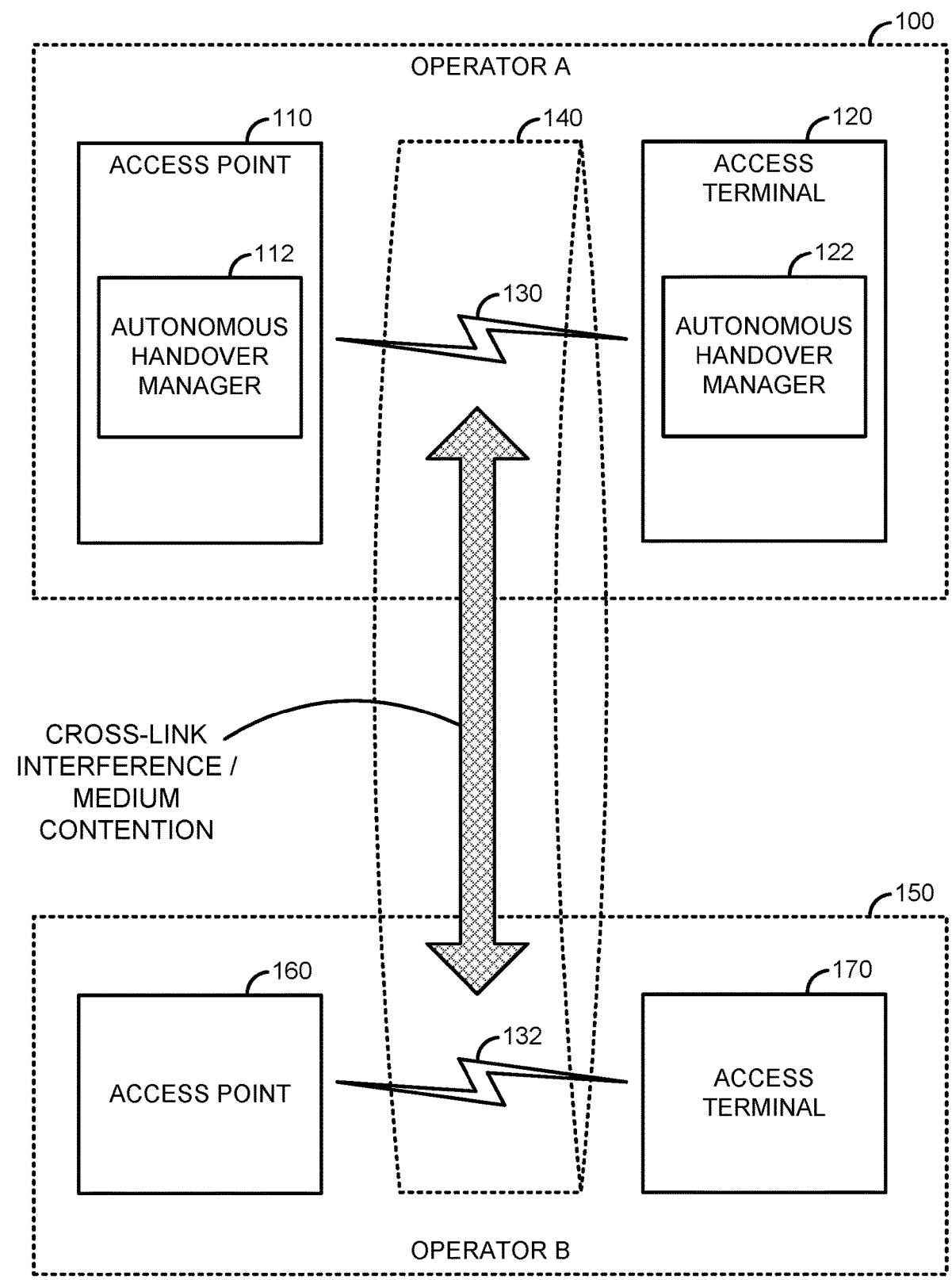
FIG. 1 is a system-level diagram illustrating an example wireless network environment.

FIG. 1 is a system-level diagram illustrating an example wireless network environment, shown by way of example as including systems from two operators, a first operator A system 100 and a second operator B system 150. Each system may be composed of different wireless nodes generally capable of receiving and/or transmitting over a wireless link, including information related to various types of communication (e.g., voice, data, multimedia services, associated control signaling, etc.). The operator A system 100 is shown as including an access point 110 and an access terminal 120 in communication with each other over a wireless link 130. The operator B system 150 is shown as including its own access point 160 and access terminal 170 in communication with each other over a separate wireless link 132.

As an example, the access point 110 and the access terminal 120 of the operator A system 100 may communicate via the wireless link 130 in accordance with a fifth generation (5G)/new radio (NR) technology or a variant thereof, while the access point 160 and the access terminal 170 of the operator B system 150 may communicate via the wireless link 132 in accordance with the same 5G technology or a different technology (e.g., Wi-Fi technology) but be deployed by a different operator (e.g., a different company or other entity controlling authorization, system timing, etc.). It will be appreciated that each system may support any number of wireless nodes distributed throughout a geographic region, with the illustrated entities being shown for illustration purposes only. Instead of 5G technology, persons skilled in the art will appreciate that communications via wireless links 130 and 132 may be configured in accordance with Long Term Evolution (LTE) technology or a variant thereof (e.g., MuLTEfire, Licensed Assisted Access (LAA), etc.).

Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), a 5G gNB, etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the operator A system 100 and the wireless link 132 used by the operator B system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed or lightly licensed frequency band. Although different licensed frequency bands have been reserved for certain communications (e.g., by a government entity such as the Federal Communications Commission (FCC) in the United States), some systems, in particular those employing small cell access points, have extended operation into unlicensed and lightly licensed frequency bands such as the Unlicensed National Information Infrastructure (U-NII) band and the Citizens Broadband (CB) Radio Service band.

Due to the shared use of the communication medium 140, there is the potential for cross-link interference between the wireless link 130 and the wireless link 132. Further, some RATs and some jurisdictions may require contention or "Listen Before Talk (LBT)" for arbitrating access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

To improve mobility performance within the system 100 when exposed to more frequent periods of inaccessibility of the communication medium 140, due to cross-link interference, medium contention, and so on, the access terminal 120 may be configured for what is referred to herein as "autonomous" handover with assistance from the access point 110. The access point 110 and/or the access terminal 120 may be variously configured in accordance with the teachings herein to provide or otherwise support autonomous handover processing and signaling. For example, the access point 110 may include an autonomous handover manager 112 and the access terminal 120 may include an autonomous handover manager 122. The autonomous handover manager 112 and/or the autonomous handover manager 122 may be configured in different ways to manage the configuration and execution of autonomous handovers on the communication medium 140.

Figure 2:
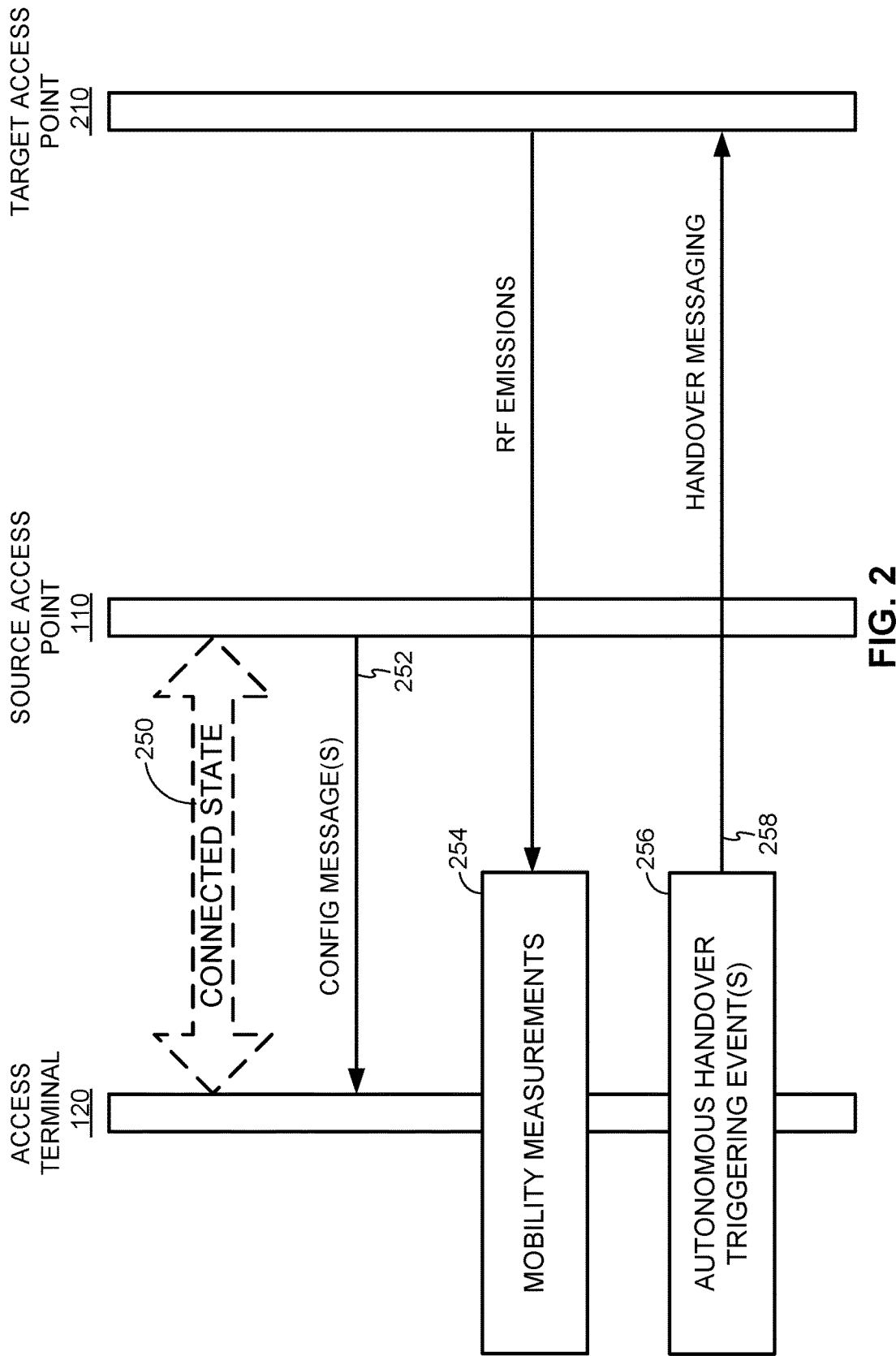
FIG. 2 is a signaling flow diagram illustrating example aspects of autonomous handover.

FIG. 2 is a signaling flow diagram illustrating example aspects of autonomous handover. In this example, the access terminal 120 is operating in an (optional) connected state 250 with the access point 110 (e.g., a Radio Resource Control (RRC) connection or the like), which serves as a "source" access point for the handover procedure. A neighboring access point 210 operating nearby serves as a "target" access point for the handover procedure. It will be appreciated that the illustrated signaling is a generalization shown only in relevant part, and that certain illustrated signaling may be omitted while other signaling may be added for a given handover procedure implementation. It will also be appreciated that handover between cells of different access points is shown for illustration purposes only, and that in some instances handover may in fact be performed between different cells of a single access point.

In the illustrated example, the source access point 110 may send to the access terminal 120 one or more configuration message(s) 252 during the connected state 250 to configure the access terminal 120 for autonomous handover. In other examples, the configuration message(s) 252 may be sent to the access terminal 120 prior to establishing the connected state 250 (e.g., in an idle state), by other access points (not shown), or in other ways. In contrast to access-point-directed handover, when configured for autonomous handover, the access terminal 120 may perform handover processing and signaling independently of any handover command that may or may not be received from the source access point 110.

As described in more detail below, the configuration message(s) 252 may also include a parameter or set of parameters defining one or more autonomous handover triggering events. Once configured, the access terminal 120 may perform one or more mobility measurements on the communication medium 140 (block 254) and use the mobility measurement(s) to monitor for the autonomous handover triggering event(s) (block 256). As distinct from other triggering events that correspond to access-point-directed handover, for example, the autonomous handover triggering event(s) may include dedicated triggering events that correspond specifically to autonomous handover. When autonomous handover is triggered, the access terminal 120 may perform a handover from the source access point 110 to the target access point 210 via associated handover signaling 258, without waiting for any further commands from the source access point 110.

Figure 3:
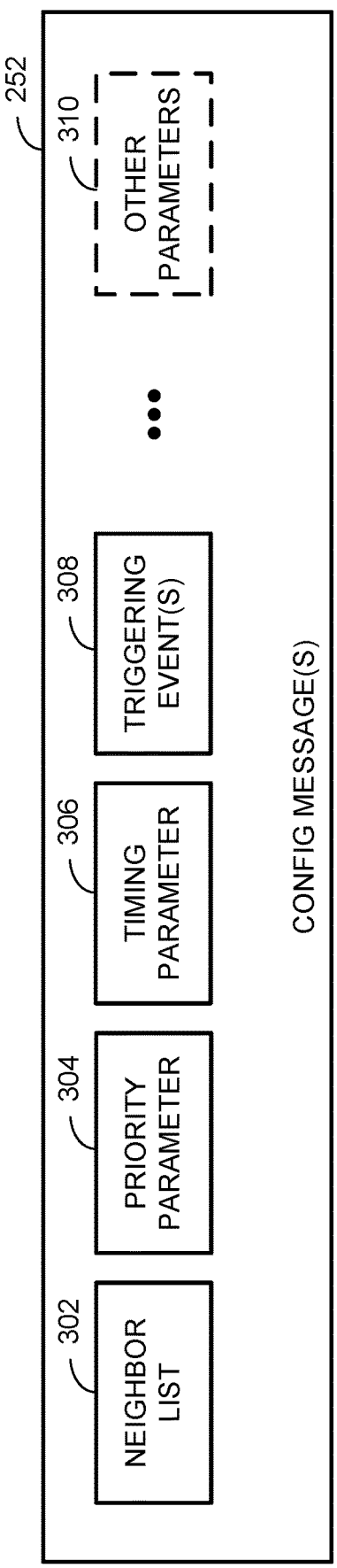
FIG. 3 illustrates an example configuration message(s) format for configuring an access terminal for autonomous handover.

FIG. 3 illustrates an example configuration message(s) format for configuring an access terminal for autonomous handover. In this example, the configuration message(s) 252 include an enhanced neighbor list field 302, a priority parameter field 304, a timing parameter field 306, a triggering event(s) field 308, and optionally other parameters 310 as required for any given implementation. It will be appreciated that the grouping of such fields into a single message is shown for illustration purposes only, and that the fields may be transmitted individually in respective configuration message(s) 252 or in any combination or sub-combination as appropriate. Further, it will also be appreciated that the representation of individual and distinct fields is again for illustration purposes only, and that the corresponding information may be transmitted not only as a standalone Information Element (IE), for example, but also as part of other IEs, as scrambling values, or any other transmission format as appropriate for conveying the relevant information.

As shown, the configuration message(s) 252 may include an enhanced neighbor list field 302 of access points (or cells) to which autonomous handover is allowed. The configuration message(s) 252 may be conveyed as a separate list or by enhancing an existing neighbor list message. Configuring the access terminal 120 in this manner may help to avoid unnecessary handover to an access point belonging to another operator because the operator ID (e.g., Public Land Mobile Network (PLMN) ID) of the target access point 210 may not be known a priori to the access terminal 120. The neighbor list field 302 may include a cell identifier (e.g., Physical Cell ID (PCI)) and an operating frequency of the target access point 210 and any other suitable access points for autonomous handover known to the source access point 110 (or other access point providing the configuration message(s) 252).

The configuration message(s) 252 may further include a priority parameter field 304 designating priority among the access points to which autonomous handover is allowed. Thus, when multiple target access points are detected, the access terminal 120 may choose the access point with the higher priority. As an example, a PCI belonging to a macro access point may be assigned a higher priority than a PCI of another small cell access point.

The configuration message(s) 252 may also include a timing parameter field 306 related to the timing of Discovery Reference Signal (DRS) occasions or the like, as well as a corresponding DRS Measurement Timing Configuration (DMTC) window of each access point to which autonomous handover is allowed. This parameter enables the access terminal 120 to measure DRS for each access point in that access point's DMTC window. The source access point 110 may learn the DRS occasions and DMTC window of neighboring access points by over-the-air listening (e.g., Network Listen (NL)) or a backhaul message exchange, or this information may be provisioned into the source access point 110.

The configuration message(s) 252 may also include a triggering event field 308 defining one or more triggering events for autonomous handover. In addition to average signal-strength-based triggering events associated with the source access point 110 and/or target access point 210 (e.g., Reference Signal Received Power (RSRP) or Reference Signal Received Quality (RSRQ) measured over a certain duration), other triggering events may be defined to create policies for autonomous handovers.

Figure 4:
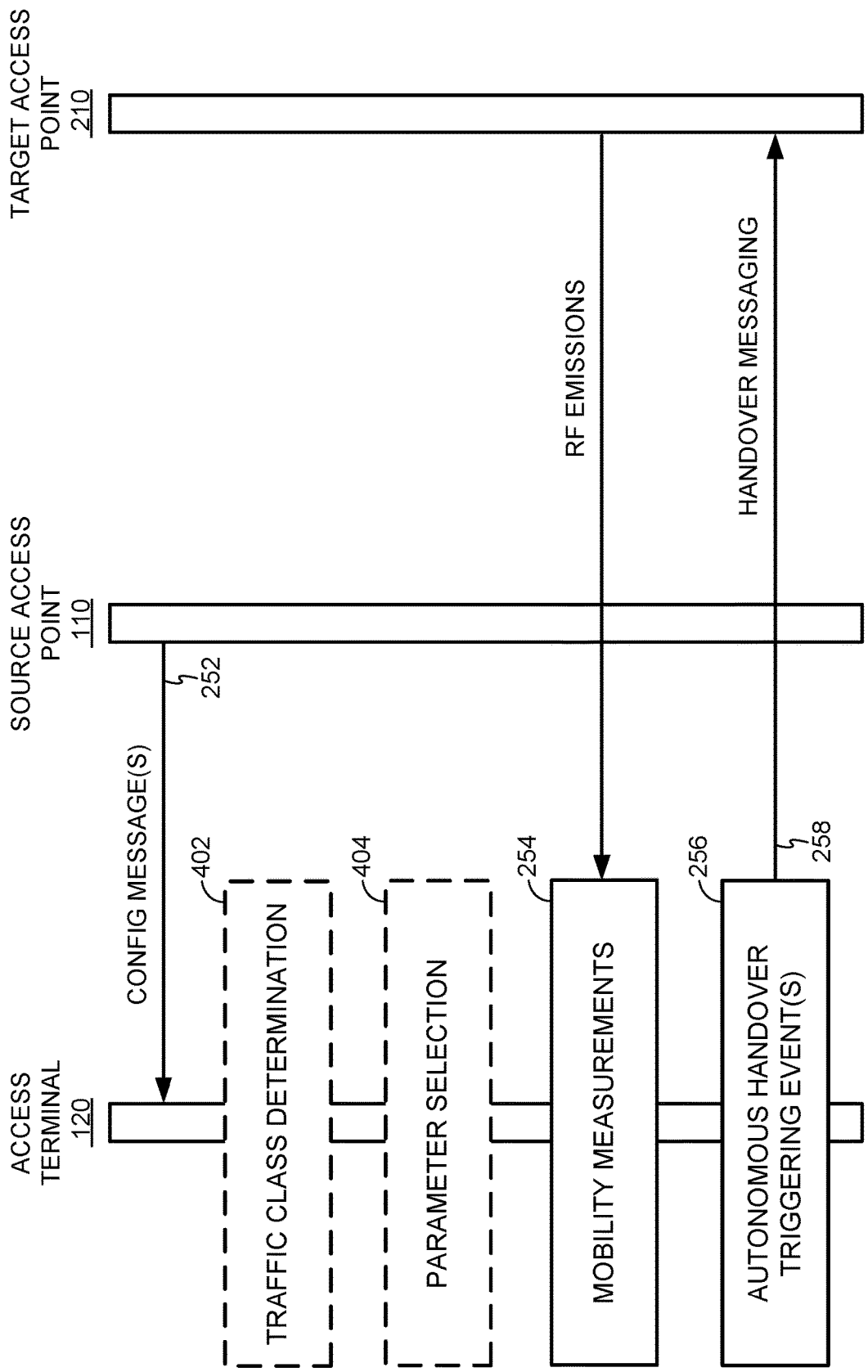
FIG. 4 is a signaling flow diagram illustrating an example of triggering event handling for autonomous handover.

FIG. 4 is a signaling flow diagram illustrating an example of triggering event handling for autonomous handover. Here, similar to FIG. 2, the access terminal 120 again receives the configuration message(s) 252 from the source access point 110, for example, and performs one or more mobility measurements (block 254) in conjunction with monitoring for one or more autonomous handover triggering event(s) (block 256).

In this example, the access terminal 120 is configured by the configuration message(s) 252 to perform autonomous handover based on a triggering event related to the traffic class (e.g., Quality of Service (QoS)) of a data exchange with the source access point 110 (e.g., as part of the connected state 250). With high QoS traffic such as voice, an earlier handover may be desirable to maintain good voice quality. Thus, the access terminal 120 may be configured to perform autonomous handover, for example, when the data being exchanged with the source access point 110 is of a certain quality (e.g., as indicated by a QoS Class Identifier (QCI)) and the average signal strength of the target access point 210 measured over a certain window exceeds a threshold (e.g., certain RSRP and/or RSRQ thresholds). If these conditions are satisfied, the access terminal 120 may perform handover to the target access point 210 autonomously—that is, in this example, without being required to send a measurement report or other notification to the source access point 110.

Returning to FIG. 4, the access terminal 120 may be configured by the configuration message(s) 252 to perform traffic-class-based autonomous handover by, for example, determining a traffic class associated with service from the source access point 110 (optional block 402) and then selecting one or more parameters of a set of parameters received in the configuration message(s) 252 based on the determined traffic class (optional block 404). For example, if the QoS level with the source access point 110 is high (e.g., for voice traffic), the access terminal 120 may select a first signal strength threshold for evaluating the target access point 210 that is relatively low in order to trigger handover more easily, whereas if the QoS level with the source access point 110 is low (e.g., for best effort data traffic), the access terminal 120 may select a second signal strength threshold for evaluating the target access point 210 that is relatively high in order to reduce the likelihood of a premature handover. The access terminal 120 may then monitor for one or more autonomous handover triggering event(s) (block 256) based on the selected parameter(s) and the mobility measurement(s).

Figure 5:
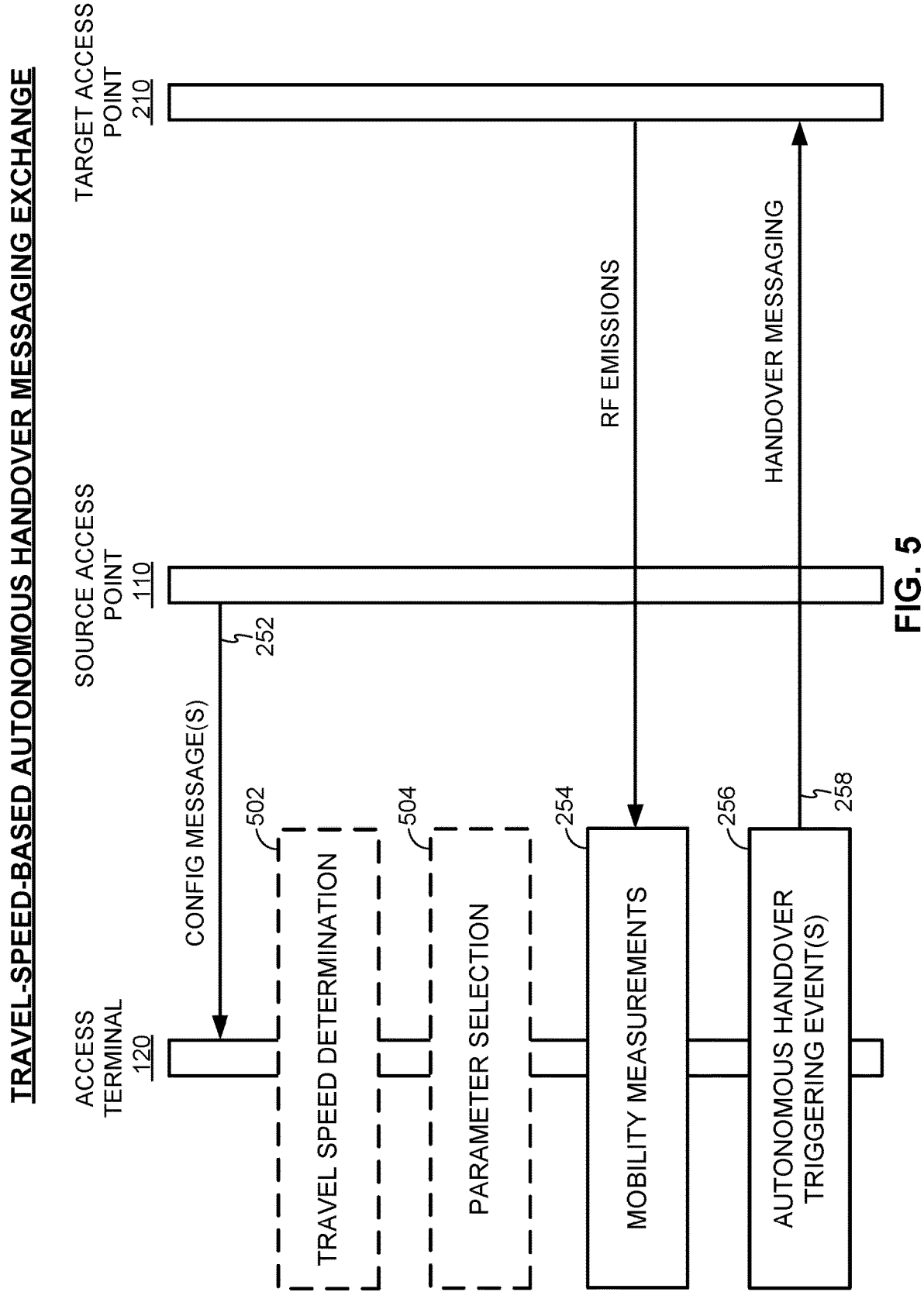
FIG. 5 is a signaling flow diagram illustrating another example of triggering event handling for autonomous handover.

FIG. 5 is a signaling flow diagram illustrating another example of triggering event handling for autonomous handover. Here, similar to FIG. 2, the access terminal 120 again receives the configuration message(s) 252 from the source access point 110, for example, and performs one or more mobility measurements (block 254) in conjunction with monitoring for one or more autonomous handover triggering event(s) (block 256).

In this example, the access terminal 120 is configured by the configuration message(s) 252 to perform autonomous handover based on a triggering event related to its travel speed. When moving at high speeds across coverage areas, an earlier handover may be desirable to maintain a timely connection. Thus, the access terminal 120 may be configured to perform autonomous handover when its speed is greater than a threshold and the average signal strength of the target access point 210 measured over a certain window exceeds a threshold (e.g., certain RSRP and/or RSRQ thresholds). This enables more robust mobility in moderate to high speed scenarios because the access terminal 120 may better preempt a potential Radio Link Failure (RLF). Additionally, in some designs, the access terminal 120 may take into account the rate of change of the signal strength measurements (e.g., RSRP and/or RSRQ) of the target access point 210.

Returning to FIG. 5, the access terminal 120 may be configured by the configuration message(s) 252 to perform travel-speed-based autonomous handover by, for example, determining a travel speed associated with the access terminal 120 (optional block 502) and then selecting one or more parameters of a set of parameters received in the configuration message(s) 252 based on the travel speed (optional block 504).

Autonomous handover events may be configured differently for different access points. For example, an event based on the speed of the access terminal 120 and the signal strength of the target access point 210 may be configured differently when the target access point 210 is a macro access point, such that a fast moving access terminal 120 will more readily connect to the macro access point (instead of another small access point). As an example, the triggering event may be associated with the PCI of the target access point 210 and the access terminal 120 may perform the autonomous handover to this PCI when event triggering conditions are satisfied.

Rather than relying on average signal strength, autonomous handover triggering events may also be defined that use other signal strength metrics such as the median signal strength (over a certain window). In multi-carrier operation, for example, the transmission power of the target access point 210 may vary depending on the number of carriers that the target access point 210 is employing and therefore the average signal strength may not be an adequate measure. Furthermore, the source access point 110 may configure the access terminal 120 to only use measurements made during the DMTC window of the target access point 210 for handover event triggering, or may weigh measurements performed within the DMTC window differently as compared to measurements performed outside of the DMTC window.

In addition to signal strength measurements such as RSRP and RSRQ, other measurement metrics may be defined to trigger autonomous handover. As an example, a DRS activity factor may be defined to capture the number of DRS instances measured (over a certain time window) for the target access point 210. Such a metric may be relative as well—e.g., taking into account the measured number of DRS instances of the target access point 210 as compared to the measured number of DRS instances of the source access point 110 (over a certain time window). A high DRS activity factor for the target access point 210 may indicate that the target access point 210 is able to better serve the access terminal 120. Thus, the access terminal 120 may perform autonomous handover to the target access point 210 when the DRS activity factor exceeds a threshold (independently or in conjunction with RSRP/RSRQ thresholds, etc.).

In general, for one or more of the handover triggering events, the source access point 110 may also configure certain timers during which trigger conditions need to be satisfied before making an autonomous handover.

Returning to FIG. 2, the access terminal 120 may perform measurements in the configured DMTC window of the target access point 210 (as part of block 254). If the DMTC window is not configured, the access terminal 120 may identify whether DRS signals are part of a DMTC window or not based on the synchronization signals detected or other indicia. For example, the sequence used for Secondary Synchronization Signals (SSS) in DRS signals within a DMTC window may be different from the SSS sequence for DRS signals elsewhere. Once the access terminal 120 identifies a DRS instance as being within a DMTC window, it may take subsequent actions for triggering events and handover (as part of block 256). The DRS signal power of the target access point 210 is not expected to vary during the DMTC window and therefore measurements in the DMTC window can be more reliable. Therefore, the access terminal 120 may use only measurements performed during the DMTC window of the target access point 210 for handover events, or may selectively combine measurements performed within and outside of the DMTC window (e.g., by applying more weight to DMTC window measurements) and accordingly generate a final measurement for handover event triggering.

Figure 6:
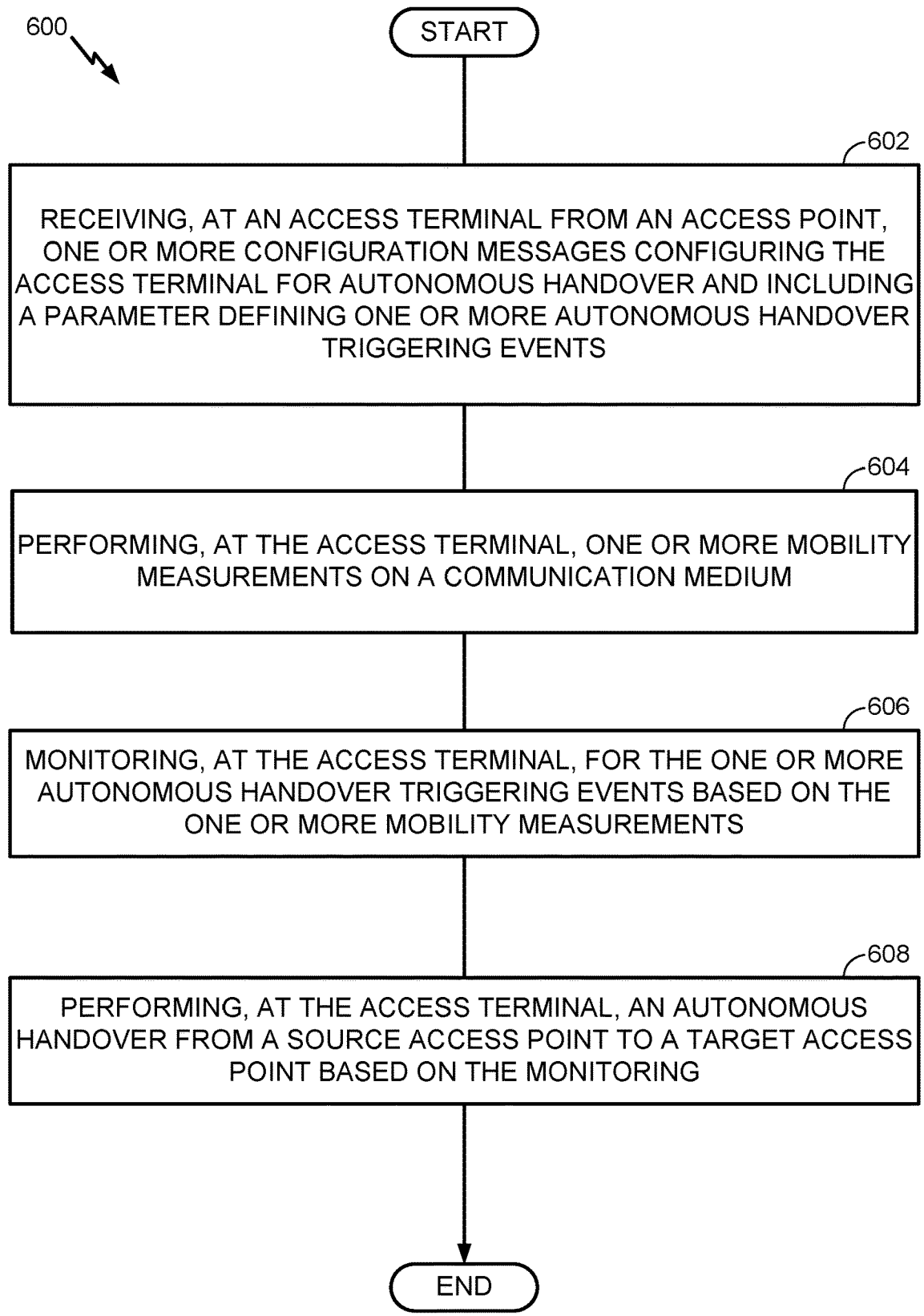
FIG. 6 is a flow diagram illustrating an example method of communication in accordance with the techniques described herein.

FIG. 6 is a flow diagram illustrating an example method of communication in accordance with the techniques described above. The method 600 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between 5G technology and Wi-Fi technology devices.

As shown, the access terminal may receive, from an access point, one or more configuration messages configuring the access terminal for autonomous handover and including a parameter defining one or more autonomous handover triggering events (block 602). The access terminal may then perform one or more mobility measurements on a communication medium (block 604) and monitor for the one or more autonomous handover triggering events based on the one or more mobility measurements (block 606). The access terminal may perform an autonomous handover from a source access point to a target access point based on the monitoring (block 608).

As discussed in more detail above, the one or more configuration messages may be received at the access terminal from the source access point, and, in some instances, while in a connected state with the serving access point. The autonomous handover may be performed by the access terminal independently of any handover command from the source access point. The one or more autonomous handover triggering events may comprise one or more dedicated triggering events that correspond to autonomous handover and are distinct from other triggering events that correspond to access-point-directed handover.

The one or more configuration messages may comprise a neighbor list of one or more access points to which autonomous handover is allowed. The neighbor list may comprise, for example, a cell identifier, an operating frequency, or a combination thereof for each of the one or more access points to which autonomous handover is allowed. The one or more configuration messages may further comprise a priority parameter associated with at least one of the one or more access points to which autonomous handover is allowed. As an example, the priority parameter may prioritize macro cell access points over small cell access points. The one or more configuration messages may further comprise a timing parameter related to a timing of a DRS occasion and a DMTC window for at least one of the one or more access points to which autonomous handover is allowed.

In some designs, the one or more autonomous handover triggering events may comprise a traffic class trigger prompting the autonomous handover based on a traffic class of a data exchange between the access terminal and the source access point being above a threshold traffic class. The one or more autonomous handover triggering events may further comprise a signal strength trigger in combination with the traffic class trigger prompting the autonomous handover based further on a signal strength of the target access point being above a threshold signal strength.

In addition or as an alternative, the one or more autonomous handover triggering events may comprise a travel speed trigger prompting the autonomous handover based on a travel speed of the access terminal being above a threshold. The one or more autonomous handover triggering events may further comprise a signal strength trigger in combination with the travel speed trigger prompting the autonomous handover based further on a signal strength of the target access point being above a threshold signal strength. The one or more autonomous handover triggering events may further comprise a cell type trigger in combination with the travel speed trigger prompting the autonomous handover based further on a cell type of the target access point.

In addition or as an alternative, the one or more autonomous handover triggering events may comprise a median signal strength trigger.

In addition or as an alternative, the one or more autonomous handover triggering events may comprise a DRS activity trigger.

Figure 7:
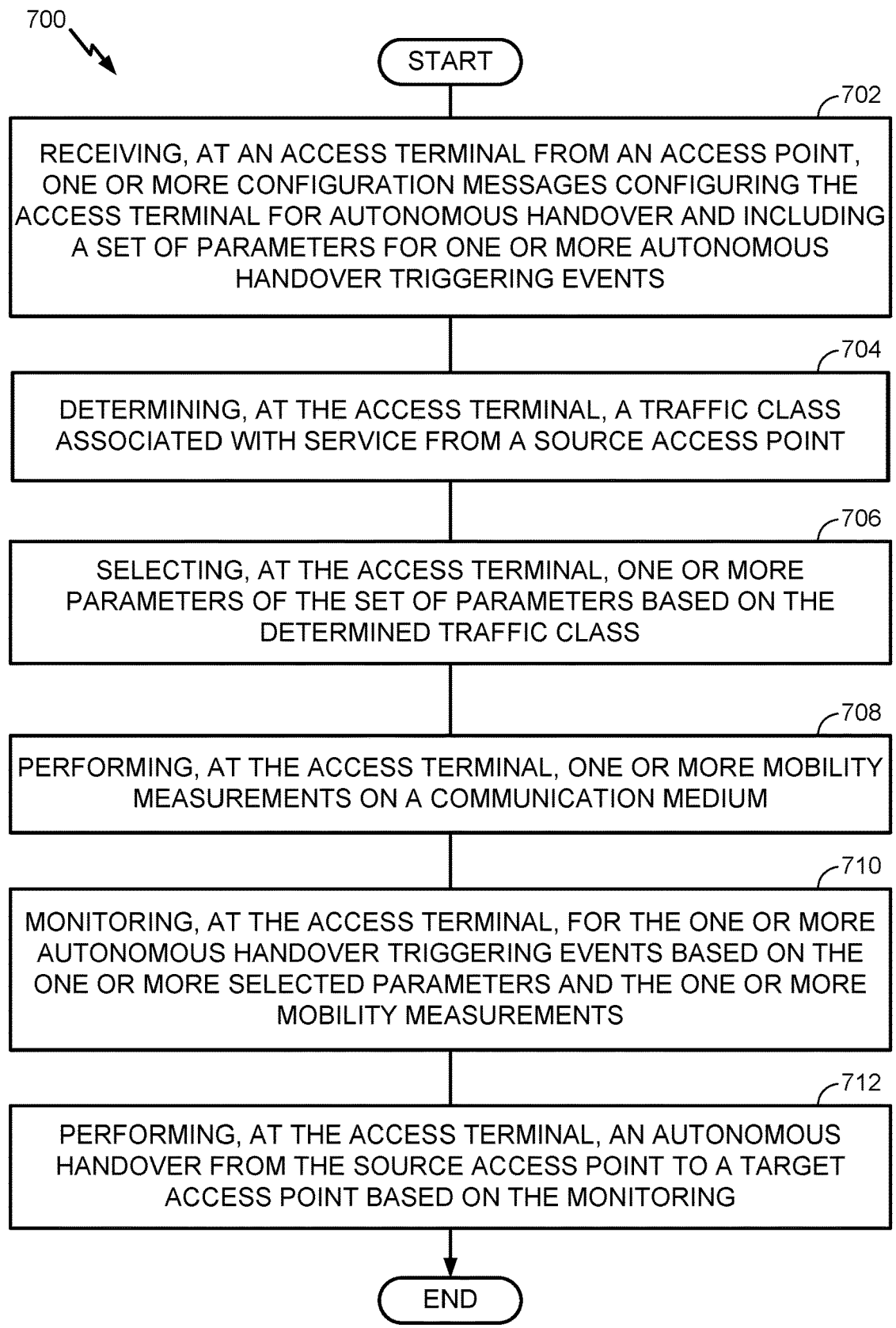
FIG. 7 is a flow diagram illustrating another example method of communication in accordance with the techniques described herein.

FIG. 7 is a flow diagram illustrating another example method of communication in accordance with the techniques described above. The method 700 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between 5G technology and Wi-Fi technology devices.

As shown, the access terminal may receive, from an access point, one or more configuration messages configuring the access terminal for autonomous handover and including a set of parameters for one or more autonomous handover triggering events (block 702). The access terminal may determine a traffic class associated with service from a source access point (block 704) and select one or more parameters of the set of parameters based on the determined traffic class (block 706). The access terminal may then perform one or more mobility measurements on a communication medium (block 708) and monitor for the one or more autonomous handover triggering events based on the one or more selected parameters and the one or more mobility measurements (block 710). The access terminal may perform an autonomous handover from the source access point to a target access point based on the monitoring (block 712).

As discussed in more detail above, the set of parameters may include, for example, a first signal strength threshold and a second signal strength threshold that is higher than the first signal strength threshold. Here, the selecting (block 706) may comprise, for example, selecting the first signal strength threshold for a first service level of the determined traffic class and the second signal strength threshold for a second service level of the determined traffic class that is lower than the first service level.

The one or more configuration messages may be received at the access terminal from the source access point, and, in some instances, while in a connected state with the serving access point. The autonomous handover may be performed by the access terminal independently of any handover command from the source access point. The one or more autonomous handover triggering events may comprise one or more dedicated triggering events that correspond to autonomous handover and are distinct from other triggering events that correspond to access-point-directed handover.

The one or more configuration messages may comprise a neighbor list of one or more access points to which autonomous handover is allowed. The neighbor list may comprise, for example, a cell identifier, an operating frequency, or a combination thereof for each of the one or more access points to which autonomous handover is allowed. The one or more configuration messages may further comprise a priority parameter associated with at least one of the one or more access points to which autonomous handover is allowed. As an example, the priority parameter may prioritize macro cell access points over small cell access points. The one or more configuration messages may further comprise a timing parameter related to a timing of a DRS occasion and a DMTC window for at least one of the one or more access points to which autonomous handover is allowed.

For generality, the access point 110 and the access terminal 120 are shown in FIG. 1 only in relevant part as including the autonomous handover manager 112 and the autonomous handover manager 122, respectively. It will be appreciated, however, that the access point 110 and the access terminal 120 may be configured in various ways to provide or otherwise support the autonomous handover techniques discussed herein.

Figure 8:
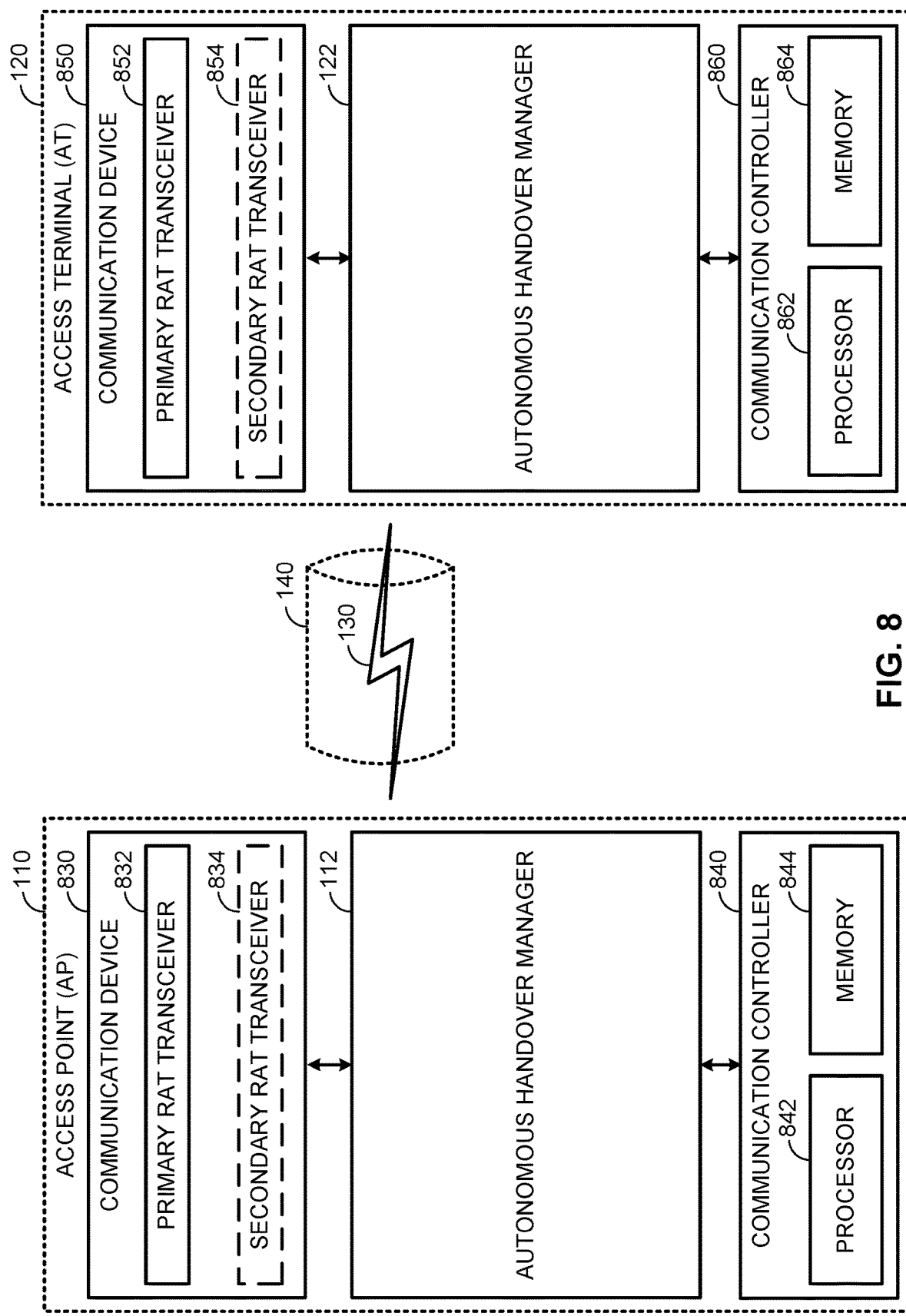
FIG. 8 is a device-level diagram illustrating example components of an access point and an access terminal in more detail.

FIG. 8 is a device-level diagram illustrating example components of the access point 110 and the access terminal 120 in more detail. As shown, the access point 110 and the access terminal 120 may each generally include a wireless communication device (represented by the communication devices 830 and 850) for communicating with other wireless nodes via at least one designated RAT. The communication devices 830 and 850 may be variously configured for transmitting and encoding signals, and, conversely, for receiving and decoding signals in accordance with the designated RAT (e.g., messages, indications, information, pilots, and so on).

The communication devices 830 and 850 may include, for example, one or more transceivers, such as respective primary RAT transceivers 832 and 852, and, in some designs, (optional) co-located secondary RAT transceivers 834 and 854, respectively (corresponding, for example, to the RAT employed by the operator B system 150, if different than the operator A system 100). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 840 and 860) for controlling operation of their respective communication devices 830 and 850 (e.g., directing, modifying, enabling, disabling, etc.). The communication controllers 840 and 860 may include one or more processors 842 and 862, and one or more memories 844 and 864 coupled to the processors 842 and 862, respectively. The memories 844 and 864 may be configured to store data, instructions, or a combination thereof, either as on-board cache memory, as separate components, a combination, etc. The processors 842 and 862 and the memories 844 and 864 may be standalone communication components or may be part of the respective host system functionality of the access point 110 and the access terminal 120.

It will be appreciated that the autonomous handover manager 112 and the autonomous handover manager 122 may be implemented in different ways. In some designs, some or all of the functionality associated therewith may be implemented by or otherwise at the direction of at least one processor (e.g., one or more of the processors 842 and/or one or more of the processors 862), at least one memory (e.g., one or more of the memories 844 and/or one or more of the memories 864), at least one transceiver (e.g., one or more of the transceivers 832 and 834 and/or one or more of the transceivers 852 and 854), or a combination thereof. In other designs, some or all of the functionality associated therewith may be implemented as a series of interrelated functional modules.

Figure 9:
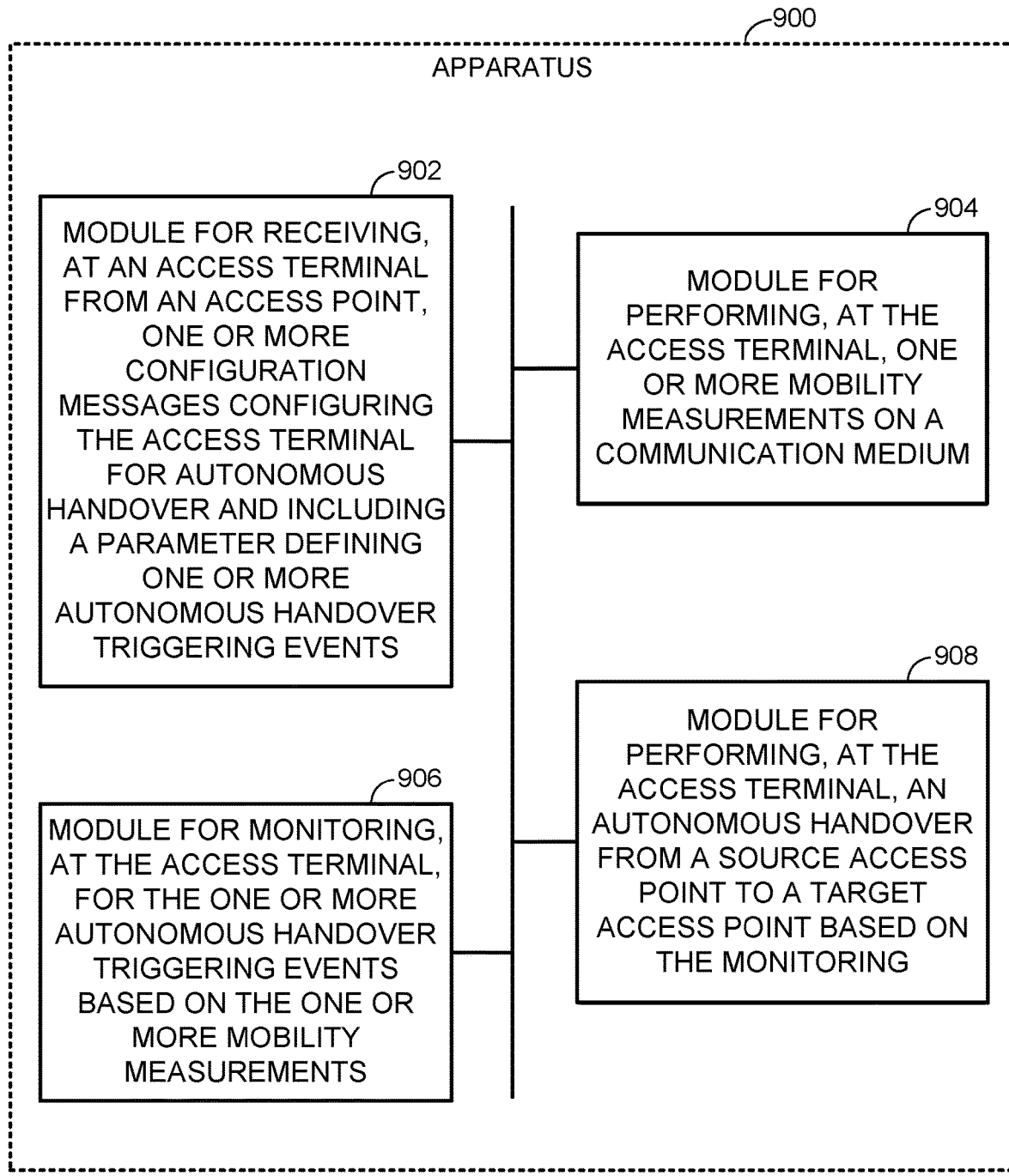
FIG. 9 illustrates an example apparatus represented as a series of interrelated functional modules.

FIG. 9 illustrates an example apparatus for implementing the autonomous handover manager 122 represented as a series of interrelated functional modules. In the illustrated example, the apparatus 900 includes a module for receiving 902, a module for performing 904, a module for monitoring 906, and a module for performing 908.

Figure 10:
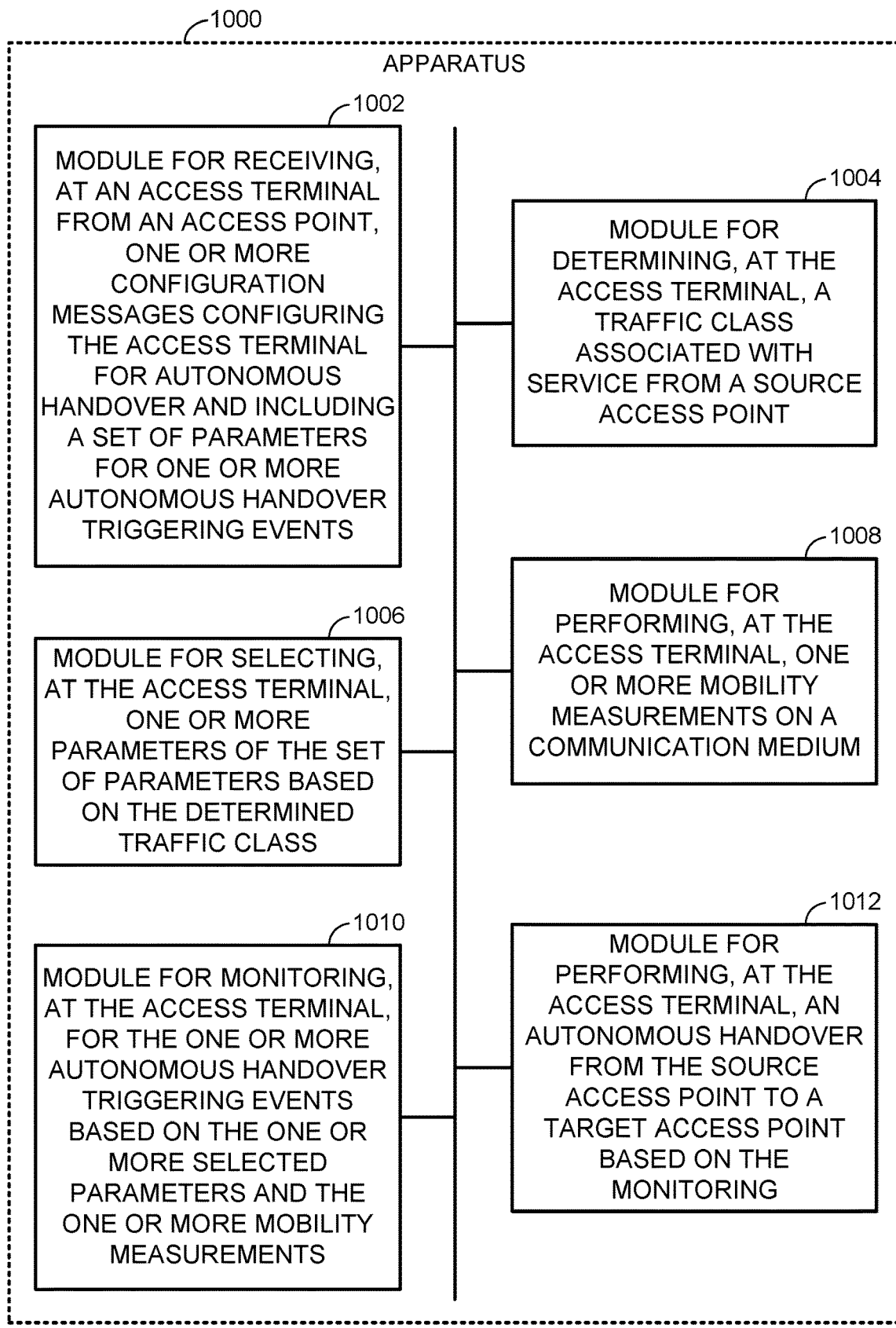
FIG. 10 illustrates another example apparatus represented as a series of interrelated functional modules.

FIG. 10 illustrates another example apparatus for implementing the autonomous handover manager 122 represented as a series of interrelated functional modules. In the illustrated example, the apparatus 1000 includes a module for receiving 1002, a module for determining 1004, a module for selecting 1006, a module for performing 1008, a module for monitoring 1010, and a module for performing 1012.

The functionality of the modules of FIGS. 9-10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9-10, as well as other components and functions described herein, may be implemented using any suitable means. Such means also may be implemented, at least in part, using corresponding structure as taught herein. For example, the components described above in conjunction with the "module for" components of FIGS. 9-10 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 9-10 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An access terminal, comprising:
a memory comprising instructions;
at least one transceiver; and
at least one processor configured to execute the instructions and cause the access terminal to:
receive, via the at least one transceiver, while the access terminal is in a radio resource control (RRC) connected state with a source access point, one or more configuration messages that configure the access terminal for autonomous handover and that include a parameter defining one or more autonomous handover triggering events, wherein the one or more autonomous handover triggering events are based on a signal strength threshold, and wherein the one or more configuration messages further indicate a window for measuring one or more synchronization signals transmitted by a target access point permitted for the autonomous handover;
perform one or more mobility measurements on a communication medium, wherein performance of the one or more mobility measurements comprises measuring, over the window, one or more signal strengths of the one or more synchronization signals transmitted by the target access point; and
perform the autonomous handover from the source access point to the target access point based at least in part on the one or more measured signal strengths satisfying the signal strength threshold, wherein the autonomous handover is performed independent of any communication from the source access point.

2. The access terminal of claim 1, wherein the one or more configuration messages are received at the access terminal from the source access point and comprise:
a neighbor list of one or more access points to which autonomous handover is allowed;
a priority parameter associated with at least one of the one or more access points to which autonomous handover is allowed; or
any combination thereof.

3. The access terminal of claim 2, wherein the neighbor list comprises a cell identifier, an operating frequency, or a combination thereof for each of the one or more access points to which autonomous handover is allowed.

4. The access terminal of claim 1, wherein the one or more signal strengths comprise one or more reference signal received power (RSRP) measurements, one or more reference signal received quality (RSRQ) measurements, or both.

5. The access terminal of claim 1, wherein the window comprises a reference signal measurement timing configuration (MTC) window or a discovery reference signal (DRS) MTC (DMTC) window.

6. The access terminal of claim 1, wherein the access terminal does not monitor the source access point after the autonomous handover is triggered.

7. The access terminal of claim 1, wherein the target access point is a neighbor cell.

8. A method of wireless communication at an access terminal, comprising:
receiving, while the access terminal is in a radio resource control (RRC) connected state with a source access point, one or more configuration messages that configure the access terminal for autonomous handover and that include a parameter defining one or more autonomous handover triggering events, wherein the one or more autonomous handover triggering events are based on a signal strength threshold, and wherein the one or more configuration messages further indicate a window for measuring one or more synchronization signals transmitted by a target access point permitted for the autonomous handover;

performing one or more mobility measurements on a communication medium, wherein performance of the one or more mobility measurements comprises measuring, over the window, one or more signal strengths of the one or more synchronization signals transmitted by the target access point; and performing an autonomous handover from the source access point to the target access point based at least in part on the one or more measured signal strengths satisfying the signal strength threshold, wherein the autonomous handover is performed independent of any communication from the source access point.

9. The method of claim 8, wherein the one or more configuration messages are received at the access terminal from the source access point and comprise:

a neighbor list of one or more access points to which autonomous handover is allowed;

a priority parameter associated with at least one of the one or more access points to which autonomous handover is allowed; or any combination thereof.

10. The method of claim 9, wherein the neighbor list comprises a cell identifier, an operating frequency, or a combination thereof for each of the one or more access points to which autonomous handover is allowed.

11. The method of claim 8, wherein the one or more signal strengths comprise one or more reference signal received power (RSRP) measurements, one or more reference signal received quality (RSRQ) measurements, or both.

12. The method of claim 8, wherein the window comprises a reference signal measurement timing configuration (MTC) window or a discovery reference signal (DRS) MTC (DMTC) window.

13. The method of claim 8, wherein the access terminal does not monitor the source access point after the autonomous handover is triggered.

14. The method of claim 8, wherein the target access point is a neighbor cell.

15. An apparatus for wireless communication, comprising:

a memory comprising instructions; and at least one processor configured to execute the instructions and cause the apparatus to:

receive, while the apparatus is in a radio resource control (RRC) connected state with a source access point, one or more configuration messages that configure the apparatus for autonomous handover and that include a parameter defining one or more autonomous handover triggering events, wherein the one or more autonomous handover triggering events are based on a signal strength threshold, and wherein the one or more configuration messages further indicate a window for measuring one or more synchronization signals transmitted by a target access point permitted for the autonomous handover;

perform one or more mobility measurements on a communication medium, wherein performance of the one or more mobility measurements comprises measuring, over the window, one or more signal strengths of the one or more synchronization signals transmitted by the target access point; and perform an autonomous handover from the source access point to the target access point based at least in part on the one or more measured signal strengths satisfying the signal strength threshold, wherein the autonomous handover is performed independent of any communication from the source access point.

16. The apparatus of claim 15, wherein the one or more configuration messages are received at the apparatus from the source access point and comprise:

a neighbor list of one or more access points to which autonomous handover is allowed;

a priority parameter associated with at least one of the one or more access points to which autonomous handover is allowed; or any combination thereof.

17. The apparatus of claim 16, wherein the neighbor list comprises a cell identifier, an operating frequency, or a combination thereof for each of the one or more access points to which autonomous handover is allowed.

18. The apparatus of claim 15, wherein the one or more signal strengths comprise one or more reference signal received power (RSRP) measurements, one or more reference signal received quality (RSRQ) measurements, or both.

19. The apparatus of claim 15, wherein the window comprises a reference signal measurement timing configuration (MTC) window or a discovery reference signal (DRS) MTC (DMTC) window.

20. The apparatus of claim 15, wherein the apparatus does not monitor the source access point after the autonomous handover is triggered.

* * * * *